United States Patent
Koch et al.

(10) Patent No.: US 6,342,106 B1
(45) Date of Patent: Jan. 29, 2002

(54) FLUX-FREE BRAZING PASTE

(75) Inventors: Jürgen Koch, Mühlheim; Sandra Wittpahl, Hanau; Leander Staab, deceased, late of Mömbris, all of (DE), by Sylvia Anita Staab, legal representative

(73) Assignee: Degussa AG, Hanau (DE)

( * ) Notice: Subject to any disclaimer, the term of this patent is extended or adjusted under 35 U.S.C. 154(b) by 0 days.

(21) Appl. No.: 09/529,972

(22) PCT Filed: Sep. 2, 1998

(86) PCT No.: PCT/EP98/05564

§ 371 Date: Oct. 25, 2000

§ 102(e) Date: Oct. 25, 2000

(87) PCT Pub. No.: WO99/21679

PCT Pub. Date: May 6, 1999

(30) Foreign Application Priority Data

Oct. 24, 1997 (DE) .......................................... 197 47 041

(51) Int. Cl.⁷ ................................................. C22C 9/02

(52) U.S. Cl. .......................... 148/24; 148/25; 228/262.6

(58) Field of Search .............................. 148/23, 24, 25; 228/262.6

(56) References Cited

U.S. PATENT DOCUMENTS

| | | | |
|---|---|---|---|
| 5,130,090 A | * | 7/1992 | Rissanen ................... 420/472 |
| 5,178,827 A | * | 1/1993 | Rissanen ................... 420/472 |
| 5,378,294 A | | 1/1995 | Rissanen |

FOREIGN PATENT DOCUMENTS

| DE | 28 40 415 A1 | 3/1979 |
|---|---|---|

* cited by examiner

*Primary Examiner*—Daniel J. Jenkins
(74) *Attorney, Agent, or Firm*—Smith, Gambrell & Russell, LLP

(57) ABSTRACT

The invention relates t a flux-free brazing paste for the brazing of copper and copper alloys. The paste includes a binder consisting of a mixture of polyisobutene with a relative molar mass from 50,000 to 500,000 and paraffin within a melting-range from 40 to 90° C.

12 Claims, No Drawings

FLUX-FREE BRAZING PASTE

INTRODUCTION AND BACKGROUND

The invention relates to a flux-free brazing paste for the brazing of copper and copper alloys.

The invention relates to a flux-free brazing paste for the brazing of copper and copper alloys.

A significant industrial field of application of the soldering of copper and copper alloys is the production of radiators for internal combustion engines, particularly for use in motor vehicles.

Although aluminium has gained considerably in importance as radiator material in the last 20 years, radiators with relatively large dimensions will, in particular, also continue to be produced from copper in the future.

Radiators of this type consist substantially of brass pipes which conduct the cooling liquid and of copper fins which are connected to said brass pipes and which dissipate the heat. In the course of production of the radiators the components are assembled and soldered to one another at the points to be joined. In this connection the use of low-melting soft solders based on high-leaded lead-tin alloys is still widespread.

In industrial series production the brass pipes of the radiators are sprayed with an aqueous flux based on zinc chloride and ammonium chloride and are subsequently presoldered with the soft solder. After the assembly of coated pipes and copper fins the complete radiator is once again immersed in the flux solution and is presoldered after drying off in a continuous furnace. The flux residues have to be removed with water after the soldering process, since otherwise signs of corrosion appear on the finished radiators. From economic and ecological viewpoints this manufacturing process is no longer competitive nowadays. The use of corrosive fluxes based on zinc chloride and ammonium chloride gives rise to a high technical and financial effort in connection with the treatment of waste water and the disposal of the flux residues. In addition, as a result of decomposition and hydrolysis of the fluxes, emissions of hydrogen chloride occur during the soldering process which have to be removed from the waste gas of the furnace by means of filters or washing plants. In addition, when they are worn out these radiators can only be recycled with great difficulty, by reason of their high lead content.

An alternative to the production of the soft-soldered copper-brass radiators is represented by brazing with low-melting copper solders. For industrial applications, copper-phosphorus solders with a melting-range of 710–880° C. or argentiferous copper-phosphorus solders with operating temperatures around 700° C. are employed as a rule. However, these solder alloys can only be used to a limited extent for the purpose of connecting the brass pipes and copper fins of the radiators, since at the requisite brazing temperatures the copper softens and already loses a large part of its strength. Recently, therefore, brazing solders have been developed that are especially suitable for the brazing of copper-brass radiators. These brazing alloys are described in greater detail in Patent Specifications U.S. Pat. No. 5,178,827, U.S. Pat. No. 5,130,090 and U.S. Pat. No. 5,378,294. Said brazing alloys consist of copper-phosphorus alloys with additions of nickel which lower the melting-point as well as, optionally, tin and manganese. The liquidus temperatures of these solder alloys lie clearly below 700° C., as a result of which brazing processes with peak temperatures below the softening-temperature of copper are made possible. These solders are self-flowing by reason of the phosphorus content and can be employed in flux-free manner under protective-gas atmosphere, preferably under nitrogen with small contents of residual oxygen, for the purpose of joining copper and brass. Further information about these brazing solders is presented in Adv. Mater. Processes (1995), 147 (5), 33 and in SAE Technical Paper 931076. However, these solder alloys have the disadvantage that they are very brittle and therefore can only be employed in the form of rapidly cooled foils (melt-spinning foils) or in powder form for the brazing of radiators. For reasons of cost, melt-spinning foils do not enter into consideration for series production. In addition, the application of the foils during assembly of the radiator components can only be integrated into an on-line manufacturing process with great difficulty.

For the alternative use of these solders in powder form it is expedient to make them available in the form of a paste in which the solder powder is dispersed in a binding-agent system and which can be applied in liquid or semiliquid form onto the objects to be brazed. Solder pastes with an extremely wide range of solder alloys and binding-agent systems are known and have been in use for a long time. As a rule, solder pastes contain flux residues in addition to the solder powder in a system consisting of organic binding agent and organic—occasionally also aqueous—solvents.

The essential criteria in the selection of the components of the binder system are that the paste remains stable and usable also over a relatively long period and that the solder does not settle irreversibly, that it is capable of being applied well without running down, in particular also from vertical surfaces, and that the binder system does not impede the brazing operation. Particularly in the case of high-melting brazing solders the binder system has to be volatilised or burnt off without leaving any residue, as far as possible without forming toxic or environmentally hazardous products.

An essential aspect in connection with the application of the solder paste is the speed of application and the drying-time. The binding agents that are employed conventionally in solder pastes have a drying-time of several minutes when use is made of high-boiling organic solvents. More readily volatile solvents such as alcohols or ketones dry more quickly, but in the process emit readily combustible vapours which necessitate elaborate measures in the plants for the purpose of protection against explosion.

In German published patent applications DE 28 40 415 and DE 30 12 925, paste formulations for certain soft solders and brazing solders are described, the binding-agent system of which exhibits thermoplastic properties. The binding agent can be chosen so that the solder paste is solid at room temperature and softens or melts at elevated temperature, roughly between 40 and 100° C. On the one hand, good storability of the paste is ensured by this means, since no settling of the solder powder can occur. On the other hand, a good result can be achieved when the paste is applied in the molten state, followed by rapid "drying" as a result of cooling. In the stated documents a large number of possible organic binding agents are specified which may be selected from natural and synthetic resins, waxes, oligomers and polymers of the most diverse nature and which may be employed individually or in combinations in such solder pastes having thermoplastic behaviour.

However, the formulation of the aforementioned low-melting copper-phosphorus alloys in powder form into thermoplastic solder pastes with a relatively large number of selected thermoplastic binding agents has resulted in unexpected problems.

In this connection it has become evident that the solder powder reacts very quickly—obviously by reason of its large surface area and its specific alloy constituents—with oxygen and atmospheric moisture, reactions which are also not prevented by embedding in the binding agent and as a result of which the wetting behaviour and flow behaviour of the solder are impaired after just a short period of storage of the paste. The high affinity of the solder powder for oxygen furthermore prevents the use of conventional binding agents such as, for example, cellulose, cellulose derivatives, polyethylene glycols etc, since the solder powder reacts during the heating-up process with the oxygenous decomposition products of the binding agents, forming slag which hinders the flowing of the solder. Moreover it has become evident that even when use is made of oxygen-free binding agents such as hydrocarbon resins etc a good brazing result can only be achieved when the solder powder that is employed has an oxygen content of less than 150 ppm. Also in this case, higher oxide contents in the solder result in incomplete brazing. As a consequence of this property of the solder powder the point of join between pipe and fin is only filled out incompletely, giving rise on the one hand to a considerable impairment of the strength and on the other hand to a marked decline in the rate of heat transfer.

With such solder-paste formulations, therefore, only in the case of an addition—in itself undesirable—of fluxes can satisfactory brazing results be obtained.

The object underlying the invention was therefore to develop a thermoplastic organic binding-agent system for oxygen-sensitive low-melting copper-phosphorus solder-alloy powders that protects the solder against oxidation and also, in the case where solder powders having an oxygen content above 150 ppm are employed without addition of fluxes, makes excellent brazed joints possible without formation of slag. In addition, the liquid binding-agent/solder-powder mixture should solidify again within an extremely short time after application and should decompose under protective-gas atmosphere without leaving any residue.

SUMMARY OF THE INVENTION

Surprisingly, it has now been found that these requirements are satisfied outstandingly by a binder system consisting of a mixture of polyisobutene with a relative molar mass from 50,000 to 500,000 and paraffin with a melting-range from 40 to 90° C.

The invention consequently provides a flux-free brazing paste consisting of a finely dispersed solder based on a copper-phosphorus alloy with an operating temperature no higher than 700° C. and of a thermoplastic organic binder system which is characterised in that the binder system consists of a mixture of polyisobutene with a relative molar mass from 50,000 to 500,000 and paraffin with a melting-range from 40 to 90° C.

It has become evident that the binder system according to the invention protects the brazing powder which is based on a low-melting copper-phosphorus alloy effectively and durably against oxidation. It furthermore presents flux-like properties, inasmuch as it causes solder powder that has already been oxidised superficially, with an oxygen content above 150 ppm, roughly up to an oxygen content of 300 ppm, to melt down in trouble-free manner in the brazing process without formation of slag. Furthermore, the binder system combines the advantageous thermoplastic properties with the trouble-free, residue-free removal in the heating-up process.

In the brazing paste according to the invention the binder system preferably consists of a mixture of polyisobutene with a relative molar mass from 60,000 to 90,000 and paraffin with a melting-range from 40 to 60° C.

By way of solder alloys, there enter into consideration in particular those which consist of 10 to 20 atom-% phosphorus, 2 to 5 atom-% nickel, 0 to 15 atom-% tin, 0 to 5.5 atom-% manganese and the rest copper.

Solder alloys of such a type, as described in the aforementioned US patents for instance, are distinguished by melting-ranges lying substantially around 600 to 650° C., so that their operating temperature does not exceed 700° C. and they can be employed in trouble-free manner for the brazing of copper and copper alloys.

The brazing paste according to the invention expediently contains 75 to 98 wt. % finely dispersed solder alloy and 25 to 2 wt. % thermoplastic organic binder. It preferably contains 80 to 95 wt. % finely dispersed solder alloy and 20 to 5 wt. % thermoplastic binder.

The qualitative and quantitative composition of the binder system is expediently chosen so that, in a blend with the solder powder, a brazing paste arises that is solid at room temperature and that passes over into the molten state starting from a temperature of 40° C.

The thermoplastic organic binder system expediently consists of 20 to 70 wt. % polyisobutene and 80 to 30 wt. % paraffin. It preferably consists of 30 to 50 wt. % polyisobutene and 70 to 50 wt. % paraffin.

Mixtures of 20 to 70 wt. % polyisobutene with a relative molar mass from 50,000 to 500,000 and 80 to 30 wt. % paraffin with a melting-range from 40 to 90° C. can be used advantageously as thermoplastic organic binder systems for brazing powders based on copper-phosphorus alloys.

DETAILED DESCRIPTION OF THE INVENTION

Brazing pastes according to the invention are outstandingly suitable for the brazing of components and copper and/or copper alloys. In particular, they may find application in very advantageous manner in the production of radiators for internal combustion engines.

The process for brazing together components made of copper and/or copper alloys, in particular in the course of the production of radiators for internal combustion engines, is effected in such a manner that a brazing paste according to the invention is applied onto the components, at least at the points to be joined, at a temperature between 40 and 90° C., the solder-paste coating is optionally solidified in an intermediate step by being cooled to a temperature below 40° C. and, for the purpose of brazing the components together, is then heated up to the operating temperature of the solder alloy, the organic binder system being removed during the heating-up operation without leaving any residue.

EXAMPLE 1

Solder-paste composition:

90.0 wt. % solder powder Cu75Sn16P5Ni4 (oxygen content: 300 ppm);

6.0 wt. % paraffin, melting-range 42–44° C.;

4.0 wt. % polyisobutene, molar mass 60,000 (Oppanol® B12, BASF AG);

viscosity (70° C., Brookfield RVT): 50 Pa·s.

EXAMPLE 2

Solder composition:

89.0 wt. % solder powder Cu75Sn16P5Ni4 (oxygen content: 300 ppm);

7.5 wt. % hard paraffin, melting-point 90° C.;

3.5 wt. % polyisobutene, molar mass 85,000 (Oppanol® B15, BASF AG);

viscosity (70° C., Brookfield RVT): 35 Pa·s.

EXAMPLE 3

Use:

The solder paste according to Example 1 is applied onto a brass plate at 70° C. and then cooled to room temperature with a view to solidification. Brazing is effected in a continuous furnace under nitrogen at 650° C. A smooth, shiny layer of solder is obtained.

EXAMPLE 4

Comparative Experiment:

The solder powder Cu75n16P5Ni4 with an oxygen content of 300 ppm is suspended in ethanol and applied by brush onto a brass plate. After the layer of solder has dried off, brazing is effected in a continuous furnace under nitrogen at 650° C. The brazing points exhibit insufficient flow of solder and black slag residues.

EXAMPLE 5

Comparative Experiment:

The solder powder is suspended in a 3-% aqueous ethyl-cellulose solution and is then processed as in Example 4. The brazing points display black slag residues and no flow of solder.

What is claimed is:

1. A flux-free brazing paste consisting of a finely dispersed solder based on a copper-phosphorous alloy with an operating temperature no higher than 700° C. and of a thermoplastic organic binder system, wherein the binder system consists of a mixture of polyisobutene with a relative molar mass from 50,000 to 500,000 and paraffin with a melting-range from 40 to 90° C.

2. The brazing paste according to claim 1, wherein the binder system consists of a mixture of polyisobutene with a relative molar mass from 60,000 to 90,000 and paraffin with a melting-range from 40 to 60° C.

3. The brazing paste according to claim 1, wherein the solder alloy consists of 10 to 20 atom-% phosphorous, 2 to 5 atom-% nickel, 0 to 15 atom-% tin, 0 to 5.5 atom-% manganese and the rest copper.

4. The brazing paste according to claim 1, wherein said brazing paste contains 75 to 98 wt. % finely dispersed solder alloy and 25 to 2 wt. % thermoplastic organic binder.

5. The brazing paste according to claim 1, wherein said brazing paste contains 80 to 95 wt. % finely dispersed solder alloy and 20 to 5 wt. % thermoplastic organic binder.

6. The brazing paste according to claim 1, wherein the thermoplastic organic binder system consists of 20 to 70 wt. % polyisobutene and 80 to 30 wt. % paraffin.

7. The brazing paste according to claim 1, wherein the thermoplastic organic binder system consists of 30 to 50 wt. % polyisobutene and 70 to 50 wt. % paraffin.

8. A process for brazing together components made of copper and/or copper alloys, comprising:

applying brazing paste according to claim 1 onto the components, at least at the points to be joined, at a temperature between 40 and 90° C., optionally solidifying the solder paste coating in an intermediate step by cooling to a temperature below 40° C. and, for the purpose of brazing the components together, heating to the operating temperature of the solder alloy to remove the organic binder system during the heating-up operation without leaving residue.

9. A method of making a brazing paste comprising:

forming of mixture of 20 to 70 wt. % polyisobutene having a relative molar mass from 50,000 to 500,000; and 80 to 30 wt. % paraffin, having a melting-range from to 40 to 90° C., as a thermoplastic organic binder system with brazing powders for brazing and oxidation sensitive low melting copper phosphorous alloy.

10. A method of making a brazing paste according to claim 9, wherein the brazing powder consists of 10 to 20 atom-% phosphorus, 2 to 5 atom-% nickel, 0 to 15 atom-% tin, 0 to 5.5 atom-% manganese and the rest being copper.

11. A method for the production of a radiator for internal combustion engine said radiator being constructed of copper or a copper alloy, comprising braze pipes and copper fins wherein the braze pipes and the copper fins are soldered to each other, at points to be joined together, comprising:

applying to said points, a flux free brazing paste comprising a finely dispersed solder formed of a copper phosphorous alloy with an operating temperature no higher than 700° C. containing a thermoplastic organic binder which is a mixture of polyisobutene with a relative molar mass of 50,000 to 500,000 and paraffin having a melting range to 40 to 90° C., optionally solidifying the solder paste coating in an intermediate step by being cool to a temperature below 40° C. and then brazing the components together by heating up to the operating temperature of the solder alloy and removing the organic binder system without leaving any residue and thereafter cooling.

12. The process of claim 11, wherein the brazing is carried out under nitrogen at elevated temperature.

* * * * *